March 3, 1964      J. G. BAKER      3,123,203
VIBRATORY CONVEYOR

Filed Jan. 31, 1961      2 Sheets-Sheet 1

INVENTOR
Jacob G. Baker

BY Mason, Fenwick & Lawrence
ATTORNEYS

March 3, 1964  J. G. BAKER  3,123,203
VIBRATORY CONVEYOR

Filed Jan. 31, 1961  2 Sheets-Sheet 2

INVENTOR
Jacob G. Baker

BY Mason, Fenwick & Lawrence
ATTORNEYS

United States Patent Office 3,123,203
Patented Mar. 3, 1964

3,123,203
VIBRATORY CONVEYOR
Jacob G. Baker, Box 28248, Dallas, Tex.
Filed Jan. 31, 1961, Ser. No. 86,044
3 Claims. (Cl. 198—220)

The present invention relates to vibratory conveyors for providing conveyance to objects or materials by imparting a combination of vertical and horizontal components of movement to an active top surface of the conveyor in response to vibration of the top surface along the desired path.

An object of the present invention is the provision of a novel vibratory conveyor of generally panel-like configuration which is of simple construction and reliable operation, and provides a very thin cross-sectional, thin panel construction.

Another object of the present invention is the provision of a novel vibratory conveyor construction which facilitates selection of a wide variety of thrust and directional characteristics.

Another object of the present invention is the provision of a novel vibratory conveyor construction having graduated speed or thrust rates progressively diminishing from the center line of the conveyor to the lateral edges thereof or from a selected intermediate point toward an end of the conveyor.

Other objects, advantages and capabilities of the present invention will become apparent from the following detailed description, taken in conjunction with the accompanying drawing illustrating preferred embodiments of the invention.

Figure 1:
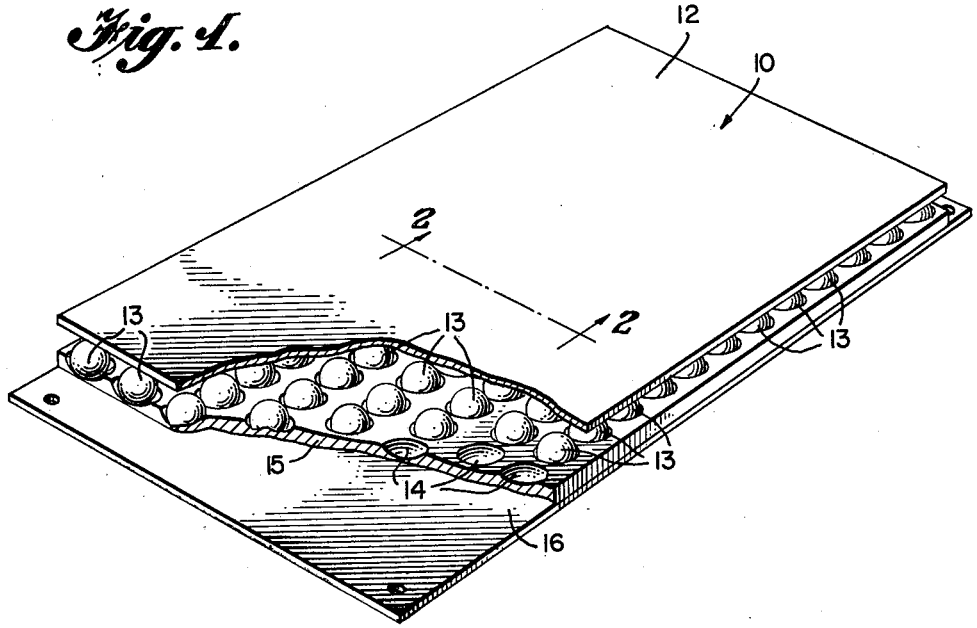
FIGURE 1 is a perspective view, with parts broken away, of a vibratory conveyor unit constructed in accordance with the present invention.
Figure 2:
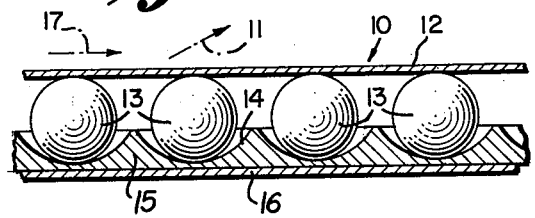
FIGURE 2 is a vertical longitudinal section view taken along the line 2—2 of FIGURE 1.

Referring to the drawing, a simple form of vibratory conveyor constructed in accordance with the present invention is illustrated in FIGURES 1 and 2, wherein a selectively directional vibratory conveyor, indicated generally by the reference character 10, uses spherical balls to produce a thrust component, indicated by the arrow 11, to toss or propel an object or material on the conveyor along a desired path. The conveyor 10 includes a flat rectangular active or top plate 12 which rides on the tops of a group of spherical balls 13. The balls 13 are seated in sockets 14 formed, for example, by molding, in a suitable body of material 15 forming part of or fixed to a base plate 16. The sockets 14 for the balls 13 have a larger radius than the balls 13, so that the balls 13, when they are rotated by application of a horizontal vibratory force on the active plate 12 along the desired path of travel, indicated by the arrow 17, ride part of the way up the sides of their associated sockets 14.

Since conveyors of this type rely upon an incremental area of the active surface or plate 12 of the conveyor achieving, during each cycle of operation, a vertical acceleration greater than the acceleration due to gravity, it will be apparent that as the balls 13 ride up on the spherically curved sides of the sockets 14 and a particle material to be conveyed is in contact with the active upper surface of the plate 12, the particle will have imparted to it an acceleration substantially the same as that imparted to the plate 12. When the direction of movement of the plate 12 is reversed and the balls 13 return down along the sides of the sockets 14, the plate 12 recedes downwardly at an acceleration greater than the acceleration due to gravity and the particle of material leaves the active surface and is tossed to another incremental area of the plate spaced along the desired direction of travel.

An important incident of this construction is the fact that the path or direction of travel of the material to be conveyed can be varied merely by changing the direction of the reciprocative vibratory motion imparted to the upper plate 12, since the spheric nature of the balls 13 and sockets 14 will produce the same action described above in any direction along which the vibratory force is applied.

Figure 3:
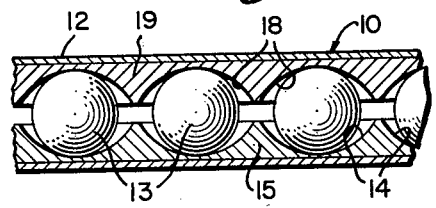
FIGURES 3, 4, 5, 6 and 7 are vertical longitudinal section views of other forms of vibratory conveyor units constructed in accordance with the present invention.

It will be apparent that, as illustrated in FIGURE 3, the thrust component 11 can be doubled for the same amplitude of applied vibratory force and the same diameters of balls 13 and sockets 14, by providing sockets 18, formed for example in a molded body 19 fixed to the upper or active plate 12. Conversely, one half the amplitude of the applied vibratory force used in the form shown in FIGURES 1 and 2 will produce the same thrust component 11 when the configuration shown in FIGURE 3 is used.

Figure 4:
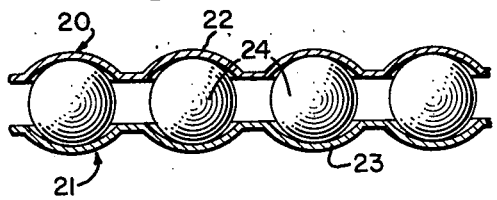

Similar operation and simple construction may be effected by the form shown in FIGURE 4 where the upper or active plate 20 and base plate 21 both formed of sheet metal, are each dimpled or stamped to provide spherical segment sockets 22, 23 having inwardly facing surfaces shaped similar to the inwardly facing surface of the sockets 13, 18 in the conveyor shown in FIGURE 3 to coact with the spherical balls 24 in a similar manner. It may be desirable to fill the void space between the balls 24 and plates 20, 21 with a resilient foamed material such as polyester urethane which is suitably bonded to the upper and lower plates 20, 21 to prevent vertical separation of the plates 20, 21 and to prevent the balls 24 from leaving their sockets 22, 23.

Figure 5:
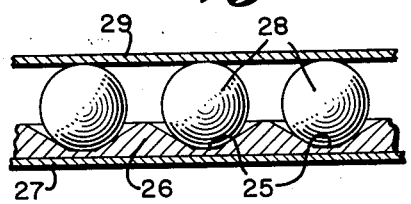

It will be apparent that thrust components similar to those produced with the form illustrated in FIGURES 1 and 2 may be effected by using conical shaped sockets 25 in the molded body of material 26 bonded to the rigid base plate 27, as illustrated in FIGURE 5, in which the spherical balls 28 ride to impart the desired vertical and horizontal thrust components to the active or top plate 29. Relative doubling of the thrust component can be achieved in the same manner obtained in the FIGURE 3 form by providing similar conical shaped sockets in a body of molded material bonded to the top plate 29.

Figure 6:
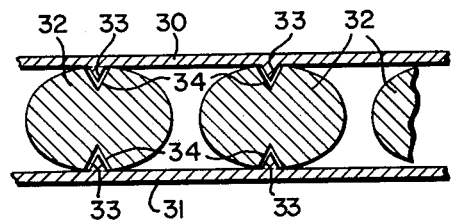
Figure 7:
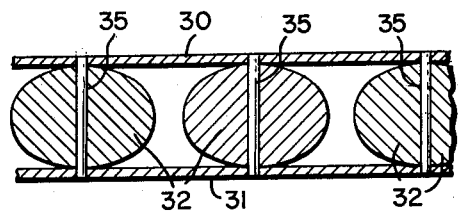

Another form of construction for producing the desired thrust component is illustrated in FIGURE 6, wherein the vibratory conveyor comprises an active or top plate 30, a base plate 31 and a plurality of oblate ellipsoidal bodies 32 disposed between the plates 30 and 31 which are rocked when the upper plate is vibrated generally along the axis of the desired path of movement 17 to impart an upward and forward thrust to the active plate 30. Pips or projections 33 on the upper and lower plates 30, 31 projecting into sockets 34 formed in the oblate ellipsoidal bodies 32, as illustrated in FIGURE 6, or flexible ties 35 secured to the upper and lower plates 30, 31 and extending through suitable bores in the oblate ellipsoidal bodies 32, as shown in FIGURE 7, position the bodies 32 during the rocking movement.

Figure 8:
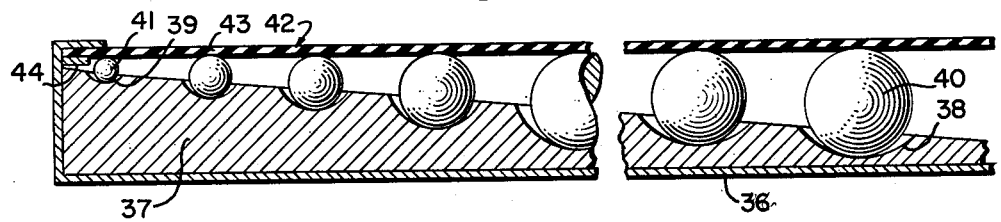
FIGURE 8 is a fragmentary vertical transverse section view through a modified vibratory conveyor unit embodying the present invention, constructed to provide conveyance thrust which diminishes progressively from the center longitudinal axis of the conveyor unit to the lateral edge thereof.

In order to provide a vibratory conveyor with a graduated ratio of thrust component progressing from an intermediate zone of the conveyor, such as the center line thereof, to an edge of the conveyor, where the greatest thrust rate is along the center line zone, an arrangement such as that illustrated in FIGURE 8 may be provided. The purpose of providing such a graduated or variable thrust is to cause different or graduated rates of travel of materials on different zones of the conveyor. Here, the vibratory conveyor includes a rigid base plate 36, a body of tapered rigid filler material 37 fixed to the base plate 36 and having its greatest thickness adjacent the outer edge of the conveyor shown to the left in FIGURE 8, the tapered rigid filler material having spherical segment sockets 38, 39 in the upper surface thereof to receive spherical balls 40 and 41. The balls 40 will be of greater diameter than the balls 41, the diameters being selected to provide the desired graduation of thrust, and the sockets 38 and 39 will be of different diameters and have a diameter greater than the balls to be seated therein to permit the balls to ride part of the way up the sides of the sockets 38, 39. The active upper layer or pan 42 of this conveyor must be formed of a material which is sufficiently flexible so that different incremental areas thereof can be displaced different distances, and may for example be formed of a web of flexible sheet material 43 bonded, such as rubberized fabric, to a rigid frame 44 extending about the outer periphery of the sheet material. It will be apparent that upon vibration of the frame 44 and the web of sheet material 43 carried thereon, the displacement of the balls 40 and 41 in the sockets 38 and 39 will produce vertical and horizontal thrust components of different values in the regions of the sheet material 43 adjacent the smaller diameter balls 41 relative to those adjacent the balls 40.

In similar manner, graduated rates of thrust or speed can be achieved by the construction illustrated in FIGURES 9 and 10, wherein the base plate 36', balls 40' and 41' and upper layer 42' are similar to those described in connection with FIGURE 8, but wherein the upper layer 42' is supported in a plane which converges toward the lateral edge of the conveyor relative to the base plate 36' and a body of rigid filler material 45 of varying thickness is fixed to the base plate 36 and provides sockets 46, 47 of different diameters for the balls 40' and 41' in accordance with the criteria mentioned in connection with the FIGURE 8 form.

Figure 9:
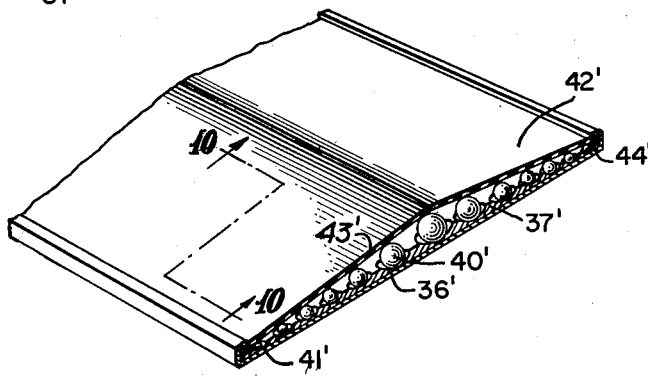
FIGURE 9 is a fragmentary sectional perspective view of another form of the vibratory conveyor construction providing variable speed and thrust rates from the central longitudinal axis to the lateral edges of the unit.
Figure 10:
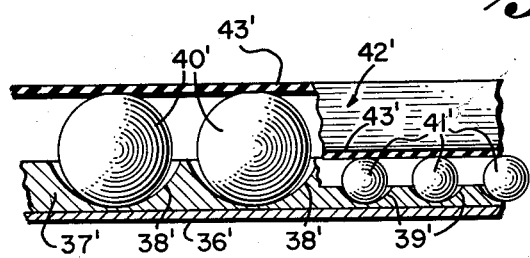
FIGURE 10 is a fragmentary vertical transverse section view taken along the line 10—10 of FIGURE 9.

It will be apparent that in each of the forms illustrated in FIGURES 8, 9 and 10, variation of the diameters of the balls and sockets may be made in accordance with well-known relationships to provide selected rates of change of vertical and horizontal thrust components imparted to the active surface of the conveyor by the different diameter balls to provide graduations of thrust or speed over wide ranges. It will also be appreciated that instead of varying the diameters of the balls as illustrated in FIGURES 8, 9 and 10, the ball diameters may be maintained constant and the diameters of the spherical segment sockets may be varied in different regions of the conveyor to provide different rates of thrust.

While several different embodiments of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A vibratory conveyor comprising a stationary base member, a vibratory work member spaced above said base member including a generally rectangular web arranged in a selected plane generally parallel to the desired path of movement of objects to be conveyed for supporting the objects on an upwardly facing surface thereof and formed of sheet material which is resiliently deformable along said selected plane and rigid frame members joined to said web for transmitting vibrations to said web in said selected plane responsive to vibratory motion imparted to said frame members, a plurality of hard roller bodies disposed between said work member and base member having opposed, generally spherical working surface portions in engagement with confronting surfaces of said base member and the web of said work member for supporting said web member above said base member, said web member imparting rotation to said roller bodies responsive to vibration of the work member, and said working surface portions of said roller bodies and said confronting surfaces of said web and base member being relatively shaped to cause said roller bodies to exert horizontal and vertical thrust components on said web upon rotation of said roller bodies, which horizontal and vertical thrust components are of different values in different regions of the web to propel objects placed on said web at different rates in different portions of the web.

2. A vibratory conveyor comprising a stationary base member, a vibratory work member spaced above said base member including a generally rectangular web arranged in a selected plane generally parallel to the desired path of movement of objects to be conveyed for supporting the objects on an upwardly facing surface thereof and formed of sheet material which is resiliently deformable along said selected plane and rigid frame members joined to said web for transmitting vibrations to said web in said selected plane responsive to vibratory motion imparted to said frame members, a plurality of hard balls disposed between said work member and base member in engagement with confronting surfaces of said base member and the web of said work member for supporting said web member above said base member, said web member imparting rotation to said balls responsive to vibration of the work member, and said balls and said confronting surfaces of said web and base member being relatively shaped to cause said balls to exert horizontal and vertical thrust components on said web upon rotation of said balls, which horizontal and vertical thrust components are of different values in different regions of the web to propel objects placed on said web at different rates in different portions of the web.

3. A vibratory conveyor comprising a stationary base member, a vibratory work member spaced above said base member including a generally rectangular web arranged in a selected plane generally parallel to the desired path of movement of objects to be conveyed for supporting the objects on an upwardly facing surface thereof and formed of sheet material which is resiliently deformable along said selected plane and rigid frame members joined to said web for transmitting vibrations to said web in said selected plane responsive to vibratory motion imparted to said frame members, said base member and work member being substantially coextensive and having confronting surfaces disposed to progressively converge from an intermediate region thereof to a marginal portion thereof, said base member including a plurality of concave sockets in the surface thereof facing said work member, a plurality of hard balls disposed between said work member and said base member nesting in said sockets and engaging said web of said work member for supporting said work member above said base member, said web imparting rotation to said balls responsive to vibration of said work member along said selected plane, said balls and said sockets and the confronting surface of said web being relatively shaped to exert horizontal and vertical thrust components on said web upon rotation of said balls for propelling objects placed on said web along said selected plane, the balls and sockets in said marginal portion being of smaller diameter than the balls and sockets in said intermediate region to impart relatively smaller horizontal and vertical thrust components on said web in said marginal portion.

References Cited in the file of this patent

FOREIGN PATENTS

| | | |
|---|---|---|
| 329,470 | Germany | Nov. 23, 1920 |
| 395,819 | Germany | May 23, 1924 |